Patented May 14, 1935

2,001,053

UNITED STATES PATENT OFFICE 2,001,053

PREPARATION OF PHTHALIC ACID

Lloyd C. Daniels, Crafton, and Alphons O. Jaeger, Mount Lebanon, Pa., assignors, by mesne assignments, to American Cyanamid & Chemical Corporation, a corporation of Delaware No Drawing. Application January 23, 1931, Serial No. 510,767

3 Claims. (Cl. 260—108)

This invention relates to the preparation of phthalic acid from phthalic anhydride and water.

Phthalic acid is used extensively in the arts and is ordinarily prepared from the anhydride, which is a cheap source by reason of its ease of preparation by the catalytic oxidation of naphthalene. Since phthalic acid is much more soluble in water than phthalic anhydride, it has been customary to heat up the phthalic anhydride with a sufficiently large amount of water to dissolve the acid as fast as it is produced, after which the acid is recovered by evaporating the solution. Since phthalic acid is quite strong and attacks almost all metals this method has entailed considerable wear and tear on the apparatus used, as well as involving considerable expense for heat in the evaporation.

We have now found that phthalic acid can be prepared from phthalic anhydride, without evaporation of excess water, simply by reacting the phthalic anhydride with insufficient amounts of water to dissolve all the phthalic acid produced. The reaction can be made to take place with the water either in the liquid phase or in the gaseous phase, that is to say with steam, and in the present specification and claims the term "water" will be used to include $H_2O$ in either the liquid or vapor phase.

When the reaction is to be carried out with water in the liquid phase, a thin stream of solid phthalic anhydride is slowly stirred into a comparatively small amount of water maintained in a vat of wood, rubber lined metal such as that produced by the Vulcalock process, or other acid resistant vessel, which does not have to be provided with heating means. The water is originally introduced at a temperature of 50° C. or higher, satisfactory reaction velocities being obtained at 50° C. and the speed increasing, of course, at temperatures up to the boiling point of the saturated solution. On the other hand, the solubility of phthalic acid in water increases rapidly with a rise in temperature, the solubility at 55° C. being 2.168 grams per one hundred grams solution and that at 85 being 7.687 grams, and consequently it is not advisable to heat to too high a temperature. Of course it is also possible to maintain the water at a fairly high temperature while the reaction is being completed and to cool after the reaction is completed, thus insuring a minimum of loss due to solution of the product when pouring off the excess water.

The reaction progresses smoothly and after the liquid has become saturated with phthalic acid crystals of the product begin to appear in the bottom of the vat, the normal heat of hydration of the phthalic acid being usually sufficient to keep the water heated. When all the phthalic anhydride has been reacted, the temperature of the solution is lowered to crystallize out as much phthalic acid as possible and the supernatant liquid is run off. The product is removed from the vat and dried, and is then ready for the market.

When phthalic acid is to be prepared by the action of steam, the phthalic anhydride is retained in a closed vessel and saturated or superheated steam is passed over or through it. The steam can have any desired degree of superheat up to 131° C., which is the melting point of phthalic anhydride; higher pressures are not recommended as melting of the phthalic anhydride would tend to interfere with the process. Reaction between the phthalic anhydride and the steam takes place smoothly and easily, and a bed of dry, pure phthalic acid is left which is immediately ready for packing and shipment. No special acid resistant apparatus is necessary, since the phthalic acid is at no time in solution and therefore can exert little if any corrosive action. This modification of the invention is particularly adapted to large scale production of phthalic acid from phthalic anhydride, and can be carried out in a continuous process by conducting phthalic anhydride on a belt or conveyor counter to a flow of steam, or in semi-continuous or batch processes by treating one or several batches with steam in cookers, retorts and the like.

What is claimed as new is:

1. A process of producing phthalic acid from phthalic anhydride which comprises reacting solid phthalic anhydride with steam.

2. A process of producing phthalic acid from phthalic anhydride which comprises reacting solid phthalic anhydride with superheated steam at temperatures below 131° C.

3. A process of producing phthalic acid which comprises passing a flow of solid phthalic anhydride in counter-current to a flow of steam.

LLOYD C. DANIELS.
ALPHONS O. JAEGER.